United States Patent
Qi et al.

(10) Patent No.: US 9,866,983 B2
(45) Date of Patent: Jan. 9, 2018

(54) SOUND IMAGE DIRECTION SENSE PROCESSING METHOD AND APPARATUS

(71) Applicant: Huawei Technologies Co., Ltd., Shenzhen (CN)

(72) Inventors: Na Qi, Beijing (CN); Xin Tong, Beijing (CN); Shucheng Fan, Beijing (CN); Qi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/487,914

(22) Filed: Apr. 14, 2017

(65) Prior Publication Data

US 2017/0223475 A1    Aug. 3, 2017

Related U.S. Application Data

(63) Continuation of application No. PCT/CN2015/080888, filed on Jun. 5, 2015.

(30) Foreign Application Priority Data

Oct. 16, 2014    (CN) .......................... 2014 1 0549266

(51) Int. Cl.
    *H04R 5/02* (2006.01)
    *H04S 1/00* (2006.01)
    *H04S 7/00* (2006.01)

(52) U.S. Cl.
    CPC ............. *H04S 1/005* (2013.01); *H04S 7/304* (2013.01); *H04S 2400/13* (2013.01); *H04S 2420/01* (2013.01); *H04S 2420/07* (2013.01)

(58) Field of Classification Search
    USPC ...... 381/26, 80, 85, 300, 307, 309, 370, 375
    See application file for complete search history.

(56) References Cited

U.S. PATENT DOCUMENTS

2002/0048376 A1    4/2002    Ukita
2007/0092085 A1    4/2007    Katayama et al.
(Continued)

FOREIGN PATENT DOCUMENTS

CN    101116374 A    1/2008
CN    101902679 A    12/2010
(Continued)

OTHER PUBLICATIONS

So et al., "Effects of Spectral Manipulation on Non-Individualized Head-Related Transfer Functions (HRTFs)," pp. 1-27 (2011).
(Continued)

*Primary Examiner* — Yosef K Laekemariam
(74) *Attorney, Agent, or Firm* — Leydig, Voit & Mayer, Ltd.

(57) ABSTRACT

According to a sound image direction sense processing method and apparatus, a left-ear channel signal, a right-ear channel signal, and a centered channel signal that are of a sound source are obtained; whether a direction of the sound source is a front direction is determined according to the left-ear channel signal, the right-ear channel signal, and the centered channel signal; and when the direction of the sound source is the front direction, at least one type of the following processing: front direction enhancing processing or rear direction weakening processing is performed separately on the left-ear channel signal and the right-ear channel signal. Therefore, a difference between front direction sense and rear direction sense of a sound image may be enlarged, so that accuracy of determining a direction of a sound source may be improved.

12 Claims, 3 Drawing Sheets

(56) References Cited

U.S. PATENT DOCUMENTS

| | | | |
|---|---|---|---|
| 2008/0219454 A1* | 9/2008 | Iida | H04S 3/00 381/17 |
| 2012/0101610 A1* | 4/2012 | Ojala | G01S 3/8083 700/94 |
| 2013/0294605 A1 | 11/2013 | Hagioka | |

FOREIGN PATENT DOCUMENTS

| | | |
|---|---|---|
| CN | 102804808 A | 11/2012 |
| CN | 103064061 A | 4/2013 |
| CN | 202998463 U | 6/2013 |
| CN | 103916734 A | 7/2014 |
| CN | 104410939 A | 3/2015 |
| JP | H05236599 A | 9/1993 |

OTHER PUBLICATIONS

Mason et al., "Integration of measurements of interaural cross-correlation coefficient and interaural time difference within a single model of perceived source width", Convention Paper 6317, pp. 1-15, XP40507066A, Presented at the 117th Convention, Audio Engineering Society, San Francisco, CA (Oct. 28-31, 2004).

\* cited by examiner

SOUND IMAGE DIRECTION SENSE PROCESSING METHOD AND APPARATUS

CROSS-REFERENCE TO RELATED APPLICATIONS

This application is a continuation of International Application No. PCT/CN2015/080888, filed on Jun. 5, 2015, which claims priority to Chinese Patent Application No. 201410549266.1, filed on Oct. 16, 2014. The disclosures of the aforementioned applications are hereby incorporated by reference in their entireties.

TECHNICAL FIELD

Embodiments of the present disclosure relate to the field of communications technologies, and in particular, to a sound image direction sense processing method and apparatus.

BACKGROUND

As audio-video technologies flourish, people impose an increasingly higher requirement on a spatial attribute of sound while seeking for 3D visual experience. If a video and audio are combined in a wearable device, a more real immersive experience effect may be generated. Because a playback device is limited only to a headset, a most appropriate method is using a binaural recording and playback technology. Binaural sound pressure includes main spatial information of sound, and therefore, a pair of miniature microphones may be disposed in ears of an artificial head phantom (or a human subject) to be used for pickup. After undergoing processes such as being enhanced, transmitted, and recorded, an obtained binaural sound signal is played back by using a headset, so that main spatial information the same as that of an original sound field is generated in ears of a listener, so as to implement playback of spatial information of sound. This is a working principle of a binaural recording and playback system. A spatial auditory effect generated by using a binaural signal-based virtual auditory playback system is more real and natural.

However, when a headset is used to play back a binaural signal, because a headset playback manner is different from the original sound field, recognition information used to determine front and rear directions is lost, and front and rear sound images are confusing to some extent. Consequently, a listener may incorrectly determine a sound image that is from a front direction as one from a rear direction.

SUMMARY

Embodiments of the present disclosure provide a sound image direction sense processing method and apparatus, so as to improve accuracy of determining a direction of a sound source.

According to a first aspect, an embodiment of the present disclosure provides a sound image direction sense processing method, including: obtaining a left-ear channel signal, a right-ear channel signal, and a centered channel signal, where the left-ear channel signal is a signal obtained by transmitting a sound source signal to a left-ear channel, the right-ear channel signal is a signal obtained by transmitting the sound source signal to a right-ear channel, and the centered channel signal is a signal obtained by transmitting the sound source signal to a centered channel, where the centered channel is located in a mid-vertical plane between the left-ear channel and the right-ear channel; determining, according to the left-ear channel signal, the right-ear channel signal, and the centered channel signal, whether a direction of a sound source is a front direction, where the front direction is a direction that the centered channel faces; and when the direction of the sound source is the front direction, performing at least one type of the following processing: front direction enhancing processing or rear direction weakening processing separately on the left-ear channel signal and the right-ear channel signal.

In a first possible implementation manner of the first aspect, the determining, according to the left-ear channel signal, the right-ear channel signal, and the centered channel signal, whether a direction of a sound source is a front direction includes: obtaining a delay difference between the left-ear channel signal and the right-ear channel signal, a delay difference between the left-ear channel signal and the centered channel signal, and a delay difference between the right-ear channel signal and the centered channel signal according to the left-ear channel signal, the right-ear channel signal, and the centered channel signal; and determining, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction.

With reference to the first possible implementation manner of the first aspect, in a second possible implementation manner of the first aspect, the obtaining a delay difference between the left-ear channel signal and the right-ear channel signal, a delay difference between the left-ear channel signal and the centered channel signal, and a delay difference between the right-ear channel signal and the centered channel signal according to the left-ear channel signal, the right-ear channel signal, and the centered channel signal includes: obtaining a Fourier coefficient $H_L(f)$ of the left-ear channel signal according to the left-ear channel signal; obtaining a Fourier coefficient $H_R(f)$ of the right-ear channel signal according to the left-ear channel signal; obtaining a Fourier coefficient $H_C(f)$ of the centered channel signal according to the left-ear channel signal;

obtaining a maximum value of $\varphi_{LR}(\tau)$ according to $$\phi_{LR}(\tau) = \frac{\int_0^\infty H_L(f) H_R^*(f) df \times e^{(j2\pi f \tau)}}{\{[\int_0^\infty |H_L(f)|^2 df][\int_0^\infty |H_R(f)|^2 df]\}^{1/2}},$$

and using a value of $\tau$ corresponding to the maximum value of $\varphi_{LR}(\tau)$ as the delay difference between the left-ear channel signal and the right-ear channel signal;

obtaining a maximum value of $\varphi_{LC}(\tau)$ according to $$\phi_{LC}(\tau) = \frac{\int_0^\infty H_L(f) H_C^*(f) df \times e^{(j2\pi f \tau)}}{\{[\int_0^\infty |H_L(f)|^2 df][\int_0^\infty |H_C(f)|^2 df]\}^{1/2}},$$

and using a value of $\tau$ corresponding to the maximum value of $\varphi_{LC}(\tau)$ as the delay difference between the left-ear channel signal and the centered channel signal; and obtaining a maximum value of $\varphi_{RC}(\tau)$ according to $$\phi_{RC}(\tau) = \frac{\int_0^x H_R(f)H_C^*(f)df \times e^{(j2\pi f\tau)}}{\{[\int_0^x |H_R(f)|^2 df][\int_0^x |H_C(f)|^2 df]\}^{1/2}},$$

and using a value of $\tau$ corresponding to the maximum value of $\varphi_{RC}(\tau)$ as the delay difference between the right-ear channel signal and the centered channel signal, where $H^*_R(f)$ and $H_R(f)$ are conjugate, $H^*_C(f)$ and $H_C(f)$ are conjugate, j represents a complex number, [0,x] represents a frequency range, and −1 ms≤τ≤1 ms.

With reference to the first possible implementation manner of the first aspect or the second possible implementation manner of the first aspect, in a third possible implementation manner of the first aspect, the determining, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction includes:
when $$0 \le \frac{c \times ITD_{LR}}{2a} \le \frac{\sqrt{2}}{2},$$

determining that an incident angle of the sound source signal is $$\arcsin\left(\frac{c \times ITD_{LR}}{2a}\right),$$

where if $|ITD_{LC}|>|ITD_{RC}|$, the incident angle of the sound source signal is greater than or equal to 0°, and is less than or equal to 45°; or if $|ITD_{LC}|<|ITD_{RC}|$, the incident angle of the sound source signal is greater than or equal to 135°, and is less than or equal to 180°;
when $$-\frac{\sqrt{2}}{2} \le \frac{c \times ITD_{LR}}{2a} \le 0,$$

determining that an incident angle of the sound source signal is $$\arcsin\left(\frac{c \times ITD_{LR}}{2a}\right),$$

where if $|ITD_{LC}|>|ITD_{RC}|$, the incident angle of the sound source signal is greater than or equal to 315°, and is less than or equal to 360°; or if $|ITD_{LC}|<|ITD_{RC}|$, the incident angle of the sound source signal is greater than or equal to 180°; and is less than or equal to 225°;
when $$\frac{\sqrt{2}}{2} \le \frac{c \times ITD_{LR}}{2a} \le 1,$$

determining that an incident angle of the sound source signal is $$45° - \arcsin\left(\frac{c \times ITD_{LR}}{2a}\right);$$

or
when $$-1 \le \frac{c \times ITD_{LR}}{2a} \le -\frac{\sqrt{2}}{2},$$

determining that an incident angle of the sound source signal is $$\arcsin\left(\frac{c \times ITD_{LC}}{2a}\right) - 45°,$$

where $ITD_{LR}$ is the delay difference between the left-ear channel signal and the right-ear channel signal, $ITD_{RC}$ is the delay difference between the right-ear channel signal and the centered channel signal, and $ITD_{LC}$ is the delay difference between the left-ear channel signal and the centered channel signal, where c represents a sound speed, and a represents a half of a distance between the left-ear channel and the right-ear channel; and determining, according to the result that the incident angle of the sound source signal is greater than or equal to 0°, and is less than or equal to 90°, or the incident angle of the sound source signal is greater than or equal to 270°, and is less than or equal to 360°, that the direction of the sound source is the front direction; or determining, according to the result that the incident angle of the sound source signal is greater than 90°, and is less than 270°, that the direction of the sound source is a rear direction, where the rear direction is a direction away from which the centered channel faces.

With reference to the third possible implementation manner of the first aspect, in a fourth possible implementation manner of the first aspect, the performing at least one type of the following processing: front direction enhancing processing or rear direction weakening processing separately on the left-ear channel signal and the right-ear channel signal includes: when the incident angle of the sound source signal is greater than or equal to 0°, and is less than or equal to a first preset angle, or when the incident angle of the sound source signal is greater than or equal to a second preset angle, and is less than or equal to 360°, performing the at least one type of the following processing: the front direction enhancing processing or the rear direction weakening processing separately on the left-ear channel signal and the right-ear channel signal, where the first preset angle is less than 90°, and the second preset angle is greater than 270°.

With reference to any one of the first aspect or the first to the fourth possible implementation manners of the first aspect, in a fifth possible implementation manner of the first aspect, the performing front direction enhancing processing separately on the left-ear channel signal and the right-ear channel signal includes: separately multiplying signals that are in the left-ear channel signal and the right-ear channel signal and whose frequency belongs to a first preset frequency band by a first gain coefficient, so as to obtain a left-ear channel signal and a right-ear channel signal that undergo the front direction enhancing processing, where the first gain coefficient is a value greater than 1, and an amplitude spectrum of a front head related transfer function (HRTF) corresponding to the first preset frequency band is greater than an amplitude spectrum of a rear HRTF corresponding to the first preset frequency band; and the performing rear direction weakening processing separately on the left-ear channel signal and the right-ear channel signal includes: separately multiplying signals that are in the left-ear channel signal and the right-ear channel signal and whose frequency belongs to a second preset frequency band by a second gain coefficient, so as to obtain a left-ear channel signal and a right-ear channel signal that undergo the rear direction weakening processing, where the second gain coefficient is a positive value less than or equal to 1, and the second preset frequency band is a frequency band other than the first preset frequency band.

With reference to the fifth possible implementation manner of the first aspect, in a sixth possible implementation manner of the first aspect, before the performing at least one type of the following processing: front direction enhancing processing or rear direction weakening processing separately on the left-ear channel signal and the right-ear channel signal, the method further comprising: obtaining an average value of an amplitude spectrum of an HRTF in a front horizontal plane of a head phantom, and an average value of an amplitude spectrum of an HRTF in a rear horizontal plane of the head phantom, where the head phantom is a head phantom to which the method is applied; performing a subtraction between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane; obtaining, according to the difference between the average value of the amplitude spectrum of the HRTF in the front horizontal plane and the average value of the amplitude spectrum of the HRTF in the rear horizontal plane, an average value of a difference that is between the average value of the amplitude spectrum of the HRTF in the front horizontal plane and the average value of the amplitude spectrum of the HRTF in the rear horizontal plane and that is within the frequency range; and using a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range as the first preset frequency band.

According to a second aspect, an embodiment of the present disclosure provides a sound image direction sense processing apparatus, including: an obtaining unit, configured to obtain a left-ear channel signal, a right-ear channel signal, and a centered channel signal, where the left-ear channel signal is a signal obtained by transmitting a sound source signal to a left-ear channel, the right-ear channel signal is a signal obtained by transmitting the sound source signal to a right-ear channel, and the centered channel signal is a signal obtained by transmitting the sound source signal to a centered channel, where the centered channel is located in a mid-vertical plane between the left-ear channel and the right-ear channel; a determining unit, configured to determine, according to the left-ear channel signal, the right-ear channel signal, and the centered channel signal that are obtained by the obtaining unit, whether a direction of the sound source is a front direction, where the front direction is a direction that the centered channel faces; and a processing unit, configured to: when the determining unit determines that the direction of the sound source is the front direction, perform at least one type of the following processing: front direction enhancing processing or rear direction weakening processing separately on the left-ear channel signal and the right-ear channel signal.

In a first possible implementation manner of the second aspect, the determining unit is configured to: obtain a delay difference between the left-ear channel signal and the right-ear channel signal, a delay difference between the left-ear channel signal and the centered channel signal, and a delay difference between the right-ear channel signal and the centered channel signal according to the left-ear channel signal, the right-ear channel signal, and the centered channel signal; and determine, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction.

With reference to the first possible implementation manner of the second aspect, in a second possible implementation manner of the second aspect, wherein the determining unit is configured to obtain the delay difference between the left-ear channel signal and the right-ear channel signal, the delay difference between the left-ear channel signal and the centered channel signal, and the delay difference between the right-ear channel signal and the centered channel signal according to the left-ear channel signal, the right-ear channel signal, and the centered channel signal comprises: the determining unit is configured to: obtain a Fourier coefficient $H_L(f)$ of the left-ear channel signal according to the left-ear channel signal; obtain a Fourier coefficient $H_R(f)$ of the right-ear channel signal according to the left-ear channel signal; obtain a Fourier coefficient $H_C(f)$ of the centered channel signal according to the left-ear channel signal;

obtain a maximum value of $\varphi_{LR}(\tau)$ according to $$\phi_{LR}(\tau) = \frac{\int_0^\infty H_L(f) H_R^*(f) df \times e^{(j2\pi f \tau)}}{\{[\int_0^\infty |H_L(f)|^2 df][\int_0^\infty |H_R(f)|^2 df]\}^{1/2}},$$

and use a value of $\tau$ corresponding to the maximum value of $\varphi_{LR}(\tau)$ as the delay difference between the left-ear channel signal and the right-ear channel signal;

obtain a maximum value of $\varphi_{LC}(\tau)$ according to $$\phi_{LC}(\tau) = \frac{\int_0^\infty H_L(f) H_C^*(f) df \times e^{(j2\pi f \tau)}}{\{[\int_0^\infty |H_L(f)|^2 df][\int_0^\infty |H_C(f)|^2 df]\}^{1/2}},$$

and use a value of $\tau$ corresponding to the maximum value of $\varphi_{LC}(\tau)$ as the delay difference between the left-ear channel signal and the centered channel signal; and obtain a maximum value of $\varphi_{RC}(\tau)$ according to $$\phi_{RC}(\tau) = \frac{\int_0^x H_R(f)H_C^*(f)df \times e^{(j2\pi f\tau)}}{\{[\int_0^x |H_R(f)|^2 df][\int_0^x |H_C(f)|^2 df]\}^{1/2}},$$

and use a value of $\tau$ corresponding to the maximum value of $\varphi_{RC}(\tau)$ as the delay difference between the right-ear channel signal and the centered channel signal, where $H^*_R(f)$ and $H_R(f)$ are conjugate, $H^*_C(f)$ and $H_C(f)$ are conjugate, j represents a complex number, [0,x] represents a frequency range, and $-1\ ms \le \tau \le 1\ ms$.

With reference to the first possible implementation manner of the second aspect or the second possible implementation manner of the second aspect, in a third possible implementation manner of the second aspect, wherein the determining unit is configured to determine, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction comprises: the determining unit is configured to:

when $$0 \le \frac{c \times ITD_{LR}}{2a} \le \frac{\sqrt{2}}{2},$$

determine that an incident angle of the sound source signal is $$\arcsin\left(\frac{c \times ITD_{LR}}{2a}\right),$$

where if $|ITD_{LC}| > |ITD_{RC}|$, the incident angle of the sound source signal is greater than or equal to 0°, and is less than or equal to 45°; or if $|ITD_{LC}| < |ITD_{RC}|$, the incident angle of the sound source signal is greater than or equal to 135°, and is less than or equal to 180°;

when $$-\frac{\sqrt{2}}{2} \le \frac{c \times ITD_{LR}}{2a} \le 0,$$

determine that an incident angle of the sound source signal is $$\arcsin\left(\frac{c \times ITD_{LR}}{2a}\right),$$

where if $|ITD_{LC}| > |ITD_{RC}|$, the incident angle of the sound source signal is greater than or equal to 315°, and is less than or equal to 360°; or if $|ITD_{LC}| < |ITD_{RC}|$, the incident angle of the sound source signal is greater than or equal to 180°; and is less than or equal to 225°;

when $$\frac{\sqrt{2}}{2} \le \frac{c \times ITD_{LR}}{2a} \le 1,$$

determine that an incident angle of the sound source signal is $$45° - \arcsin\left(\frac{c \times ITD_{RC}}{2a}\right);$$

or
when $$-1 \le \frac{c \times ITD_{LR}}{2a} \le -\frac{\sqrt{2}}{1},$$

determine that an incident angle of the sound source signal is $$\arcsin\left(\frac{c \times ITD_{LC}}{2a}\right) - 45°,$$

where $ITD_{LR}$ is the delay difference between the left-ear channel signal and the right-ear channel signal, $ITD_{RC}$ is the delay difference between the right-ear channel signal and the centered channel signal, and $ITD_{LC}$ is the delay difference between the left-ear channel signal and the centered channel signal, where c represents a sound speed, and a represents a half of a distance between the left-ear channel and the right-ear channel; and determine, according to the result that the incident angle of the sound source signal is greater than or equal to 0°, and is less than or equal to 90°, or the incident angle of the sound source signal is greater than or equal to 270°, and is less than or equal to 360°, that the direction of the sound source is the front direction; or determine, according to the result that the incident angle of the sound source signal is greater than 90°, and is less than 270°, that the direction of the sound source is a rear direction, where the rear direction is a direction away from which the centered channel faces.

With reference to the third possible implementation manner of the second aspect, in a fourth possible implementation manner of the second aspect, the processing unit is configured to: when the determining unit determines that the incident angle of the sound source signal is greater than or equal to 0°, and is less than or equal to a first preset angle, or the incident angle of the sound source signal is greater than or equal to a second preset angle, and is less than or equal to 360°, perform the at least one type of the following processing: the front direction enhancing processing or the rear direction weakening processing separately on the left-ear channel signal and the right-ear channel signal, where the first preset angle is less than 90°, and the second preset angle is greater than 270°.

With reference to any one of the second aspect or the first to the fourth possible implementation manners of the second aspect, in a fifth possible implementation manner of the second aspect, wherein the processing unit is configured to perform the front direction enhancing processing separately on the left-ear channel signal and the right-ear channel signal comprises: the processing unit is configured to: separately multiply signals that are in the left-ear channel signal and the right-ear channel signal and whose frequency belongs to a first preset frequency band by a first gain coefficient, so as to obtain a left-ear channel signal and a right-ear channel signal that undergo the front direction enhancing processing, where the first gain coefficient is a value greater than 1, and an amplitude spectrum of a front head related transfer function HRTF corresponding to the first preset frequency band is greater than an amplitude spectrum of a rear HRTF corresponding to the first preset frequency band; and wherein the processing unit is configured to perform the rear direction weakening processing separately on the left-ear channel signal and the right-ear channel signal comprises: the processing unit is configured to: separately multiply signals that are in the left-ear channel signal and the right-ear channel signal and whose frequency belongs to a second preset frequency band by a second gain coefficient, so as to obtain a left-ear channel signal and a right-ear channel signal that undergo the rear direction weakening processing, where the second gain coefficient is a positive value less than or equal to 1, and the second preset frequency band is a frequency band other than the first preset frequency band.

With reference to the fifth possible implementation manner of the second aspect, in a sixth possible implementation manner of the second aspect, the obtaining unit is further configured to: before the processing unit performs the at least one type of the following processing: the front direction enhancing processing or the rear direction weakening processing separately on the left-ear channel signal and the right-ear channel signal, obtain an average value of an amplitude spectrum of an HRTF in a front horizontal plane of a head phantom, and an average value of an amplitude spectrum of an HRTF in a rear horizontal plane of the head phantom, where the head phantom is a head phantom to which the apparatus is applied; perform a subtraction between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane; obtain, according to the difference between the average value of the amplitude spectrum of the HRTF in the front horizontal plane and the average value of the amplitude spectrum of the HRTF in the rear horizontal plane, an average value of a difference that is between the average value of the amplitude spectrum of the HRTF in the front horizontal plane and the average value of the amplitude spectrum of the HRTF in the rear horizontal plane and that is within the frequency range; and use a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range as the first preset frequency band.

According to the sound image direction sense processing method and apparatus provided in the embodiments of the present disclosure, a left-ear channel signal, a right-ear channel signal, and a centered channel signal that are of a sound source are obtained, so as to determine whether a direction of the sound source is a front direction; and when the direction of the sound source is the front direction, at least one type of the following processing: front direction enhancing processing or rear direction weakening processing is performed separately on the left-ear channel signal and the right-ear channel signal. Therefore, a difference between front direction sense and rear direction sense of a sound image may be enlarged, so that accuracy of determining a direction of a sound source may be improved.

BRIEF DESCRIPTION OF DRAWINGS

To describe the technical solutions in the embodiments of the present disclosure more clearly, the following briefly describes the accompanying drawings for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
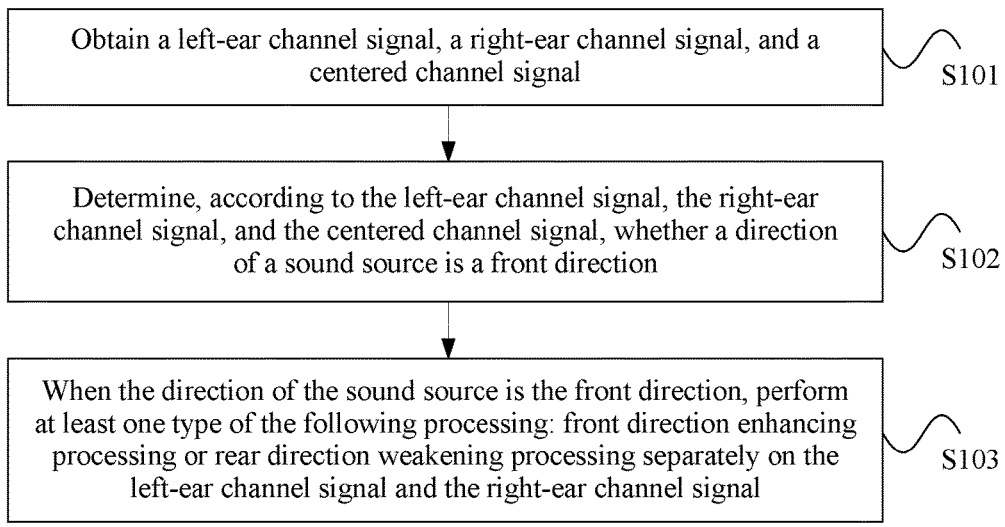
FIG. 1 is a flowchart of Embodiment 1 of a sound image direction sense processing method according to the present disclosure.

FIG. 1 is a flowchart of Embodiment 1 of a sound image direction sense processing method according to the present disclosure. As shown in FIG. 1, the method in this embodiment may include the following steps.

S101. Obtain a left-ear channel signal, a right-ear channel signal, and a centered channel signal.

The left-ear channel signal is a signal obtained by transmitting a sound source signal to a left-ear channel, the right-ear channel signal is a signal obtained by transmitting the sound source signal to a right-ear channel, and the centered channel signal is a signal obtained by transmitting the sound source signal to a centered channel. The centered channel is located in a mid-vertical plane between the left-ear channel and the right-ear channel.

In this embodiment, a signal is sent by a sound source, and the signal is referred to as a sound source signal. Then, a left-ear channel signal, a right-ear channel signal, and a centered channel signal may be obtained. Specifically, a microphone may be disposed in a left ear to obtain the signal sent by the sound source, and an obtained signal is referred to as the left-ear channel signal; a microphone may be disposed in a right ear to obtain the signal sent by the sound source, and an obtained signal is referred to as the right-ear channel signal; and a microphone may be disposed in a mid-vertical plane between the left ear and the right ear to obtain the signal sent by the sound source, and an obtained signal is referred to as the centered channel signal. The microphone disposed in the mid-vertical plane between the left ear and the right ear may be disposed, for example, on a forehead or a nose bridge on a head of a person.

S102. Determine, according to the left-ear channel signal, the right-ear channel signal, and the centered channel signal, whether a direction of the sound source is a front direction.

In this embodiment, whether the direction of the sound source is the front direction is determined according to the left-ear channel signal, the right-ear channel signal, and the newly-added centered channel signal. The front direction is a direction that the centered channel faces. For example, the front direction is a direction that a face of a user who uses the sound image direction sense processing method according to this embodiment of the present disclosure faces. Compared with the prior art, a centered channel signal is additionally obtained, and then whether the direction of the sound source is the front direction may be determined according to the left-ear channel signal, the right-ear channel signal, and the added centered channel signal.

S103. When the direction of the sound source is the front direction, perform at least one type of the following processing: front direction enhancing processing or rear direction weakening processing separately on the left-ear channel signal and the right-ear channel signal.

In this embodiment, when the direction of the sound source is the front direction, the front direction enhancing processing may be performed on the left-ear channel signal, and the front direction enhancing processing may be performed on the right-ear channel signal; or the rear direction weakening processing may be performed on the left-ear channel signal, and the rear direction weakening processing may be performed on the right-ear channel signal; or the front direction enhancing processing and the rear direction weakening processing may be performed on the left-ear channel signal, and the front direction enhancing processing and the rear direction weakening processing may be performed on the right-ear channel signal. After receiving a left-ear channel signal and a right-ear channel signal that undergo the foregoing processing, a listener generates sense on the sound source, and this sense is referred to a sound image. A difference between front direction sense and rear direction sense of the sound image may be enlarged by means of processing in any one of the foregoing manners, so that the listener can accurately recognize that the sound source is from the front direction.

According to the sound image direction sense processing method provided in this embodiment of the present disclosure, a left-ear channel signal, a right-ear channel signal, and a centered channel signal that are of a sound source are obtained, where the centered channel is located in a mid-vertical plane between the left-ear channel and the right-ear channel; whether a direction of the sound source is a front direction is determined according to the left-ear channel signal, the right-ear channel signal, and the centered channel signal, where the front direction is a direction that the centered channel faces; and when the direction of the sound source is the front direction, at least one type of the following processing: front direction enhancing processing or rear direction weakening processing is performed separately on the left-ear channel signal and the right-ear channel signal. Therefore, a difference between front direction sense and rear direction sense of a sound image may be enlarged, so that a listener can accurately recognize that the sound source is from the front direction, thereby improving accuracy of determining a direction of a sound source.

Figure 2:
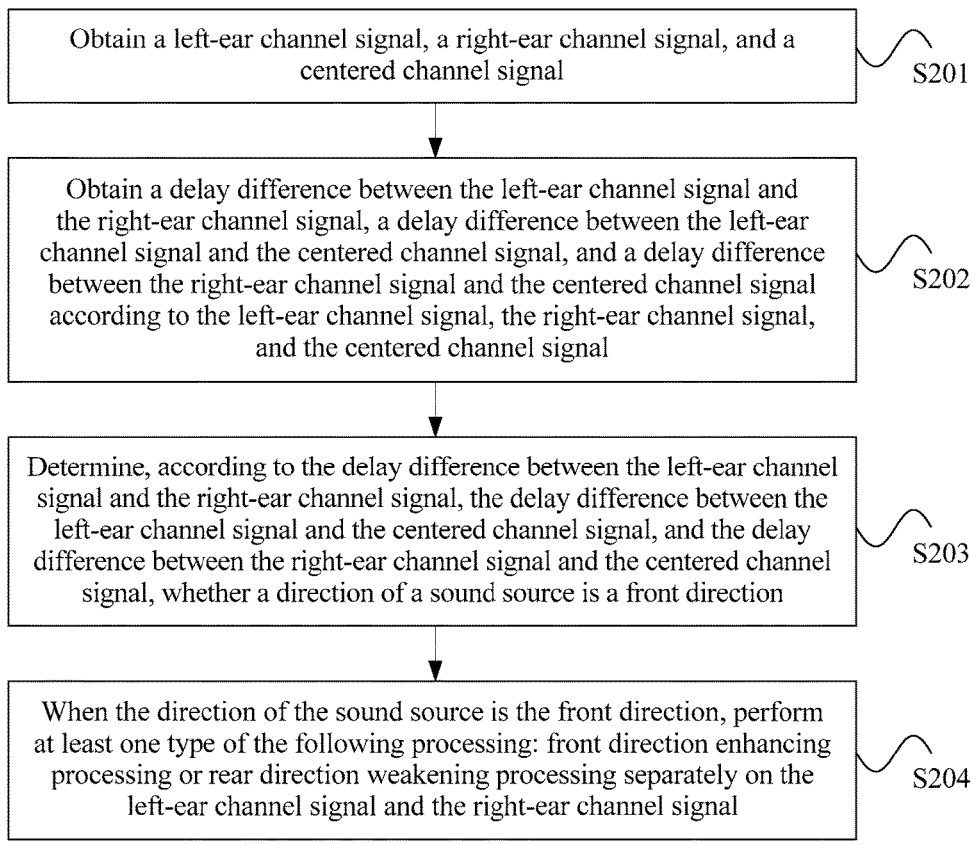
FIG. 2 is a flowchart of Embodiment 2 of a sound image direction sense processing method according to the present disclosure.

FIG. 2 is a flowchart of Embodiment 2 of a sound image direction sense processing method according to the present disclosure. As shown in FIG. 2, the method in this embodiment may include the following steps.

S201. Obtain a left-ear channel signal, a right-ear channel signal, and a centered channel signal.

In this embodiment, for a specific implementation process of S201, refer to a specific implementation process of S101 in Embodiment 1 of the method in the present disclosure, and details are not described herein.

S202. Obtain a delay difference between the left-ear channel signal and the right-ear channel signal, a delay difference between the left-ear channel signal and the centered channel signal, and a delay difference between the right-ear channel signal and the centered channel signal according to the left-ear channel signal, the right-ear channel signal, and the centered channel signal.

In this embodiment, the delay difference between the left-ear channel signal and the right-ear channel signal may be obtained according to the obtained left-ear channel signal and right-ear channel signal; the delay difference between the left-ear channel signal and the centered channel signal may be obtained according to the obtained left-ear channel signal and centered channel signal; and the delay difference between the right-ear channel signal and the centered channel signal may be obtained according to the obtained right-ear channel signal and centered channel signal.

In a specific implementation manner, the foregoing S202 may include the following content: obtaining a Fourier coefficient $H_L(f)$ of the left-ear channel signal according to the obtained left-ear channel signal, where $H_L(f)$ is a $f$ related function, and $f$ is a frequency of the left-ear channel signal; obtaining a Fourier coefficient $H_R(f)$ of the right-ear channel signal according to the obtained left-ear channel signal, where $H_R(f)$ is a $f$ related function, and $f$ is a frequency; obtaining a Fourier coefficient $H_C(f)$ of the centered channel signal according to the obtained left-ear channel signal, where $H_C(f)$ is a $f$ related function, and $f$ is a frequency; and then obtaining the delay difference between the left-ear channel signal and the right-ear channel signal according to a formula (1), and specifically, obtaining a maximum value of $\varphi_{LR}(\tau)$ according to the formula (1), and using a value of $\tau$ corresponding to the maximum value of $\varphi_{LR}(\tau)$ as the delay difference between the left-ear channel signal and the right-ear channel signal.

The formula (1) is $$\phi_{LR}(\tau) = \frac{\int_0^\infty H_L(f) H_R^*(f) \, df \times e^{(j2\pi f \tau)}}{\{[\int_0^\infty |H_L(f)|^2 df][\int_0^\infty |H_R(f)|^2 df]\}^{1/2}},$$

where $H_R^*(f)$ and $H_R(f)$ are conjugate, j represents a complex number, [0,x] represents a low frequency range, and $-1 \text{ ms} \leq \tau \leq 1 \text{ ms}$.

The delay difference between the left-ear channel signal and the centered channel signal may be further obtained according to a formula (2). Specifically, a maximum value of $\varphi_{LC}(\tau)$ is obtained according to the formula (2), and a value of $\tau$ corresponding to the maximum value of $\varphi_{LC}(\tau)$ is used as the delay difference between the left-ear channel signal and the centered channel signal.

The formula (2) is $$\phi_{LC}(\tau) = \frac{\int_0^x H_L(f)H_C^*(f)df \times e^{(j2\pi f\tau)}}{\{[\int_0^x |H_L(f)|^2 df][\int_0^x |H_C(f)|^2 df]\}^{1/2}},$$

where $H^*_C(f)$ and $H_C(f)$ are conjugate, j represents a complex number, [0,x] represents a frequency range, and −1 ms≤τ≤1 ms.

The delay difference between the right-ear channel signal and the centered channel signal may be further obtained according to a formula (3). Specifically, a maximum value of $\varphi_{RC}(\tau)$ is obtained according to the formula (3), and a value of $\tau$ corresponding to the maximum value of $\varphi_{RC}(\tau)$ is used as the delay difference between the right-ear channel signal and the centered channel signal.

The formula (3) is $$\phi_{RC}(\tau) = \frac{\int_0^x H_R(f)H_C^*(f)df \times e^{(j2\pi f\tau)}}{\{[\int_0^x |H_R(f)|^2 df][\int_0^x |H_C(f)|^2 df]\}^{1/2}},$$

where $H^*_C(f)$ and $H_C(f)$ are conjugate, j represents a complex number, [0,x] represents a low frequency range, and −1 ms≤τ≤1 ms.

S203. Determine, according to the delay difference between the left-ear channel signal and the right-ear channel signal, the delay difference between the left-ear channel signal and the centered channel signal, and the delay difference between the right-ear channel signal and the centered channel signal, whether a direction of the sound source is a front direction.

In a specific implementation manner, S203 may include the following content.

$$\frac{c \times ITD_{LR}}{2a}$$

may be obtained according to the delay difference between the left-ear channel signal and the right-ear channel signal, where $ITD_{LR}$ is the delay difference between the left-ear channel signal and the right-ear channel signal, C is a sound speed, and a is a half of a distance between the left-ear channel and the right-ear channel.

In a first case, when $$0 \le \frac{c \times ITD_{LR}}{2a} \le \frac{\sqrt{2}}{2},$$

it may be determined that an incident angle of the sound source signal is $$\arcsin\left(\frac{c \times ITD_{LR}}{2a}\right),$$

and then whether the delay difference $ITD_{LC}$ between the left-ear channel signal and the centered channel signal is greater than or equal to the delay difference $ITD_{RC}$ between the right-ear channel and the centered channel signal is determined. If $|ITD_{LC}|\ge|ITD_{RC}|$, the incident angle of the sound source signal is greater than or equal to 0°, and is less than or equal to 45°, that is, the incident angle of the sound source signal belongs to an angle range [0°, 45]; or if $|ITD_{LC}|<|ITD_{RC}|$, the incident angle of the sound source signal is greater than or equal to 135°, and is less than or equal to 180°, that is, the incident angle of the sound source signal belongs to an angle range [135°,180].

In a second case, when $$-\frac{\sqrt{2}}{2} \le \frac{c \times ITD_{LR}}{2a} \le 0,$$

an incident angle of the sound source signal is $$\arcsin\left(\frac{c \times ITD_{LR}}{2a}\right),$$

and then whether $ITD_{LC}$ is greater than or equal to $ITD_{RC}$ is determined. If $|ITD_{LC}|\ge|ITD_{RC}|$, the incident angle of the sound source signal is greater than or equal to 315°, and is less than or equal to 360°, that is, the incident angle of the sound source signal belongs to an angle range [315°,360°]; or if $|ITD_{LC}|<|ITD_{RC}|$, the incident angle of the sound source signal is greater than or equal to 180°, and is less than or equal to 225°, that is, the incident angle of the sound source signal belongs to an angle range [180°,225°].

In a third case, when $$\frac{\sqrt{2}}{2} \le \frac{c \times ITD_{LR}}{2a} \le 1,$$

an incident angle of the sound source single is $$45° - \arcsin\left(\frac{c \times ITD_{RC}}{2a}\right).$$

In a fourth case, when $$-1 \le \frac{c \times ITD_{LR}}{2a} \le -\frac{\sqrt{2}}{2},$$

an incident angle of a sound source signal is $$\arcsin\left(\frac{c \times ITD_{LC}}{2a}\right) - 45°.$$

Figure 3:
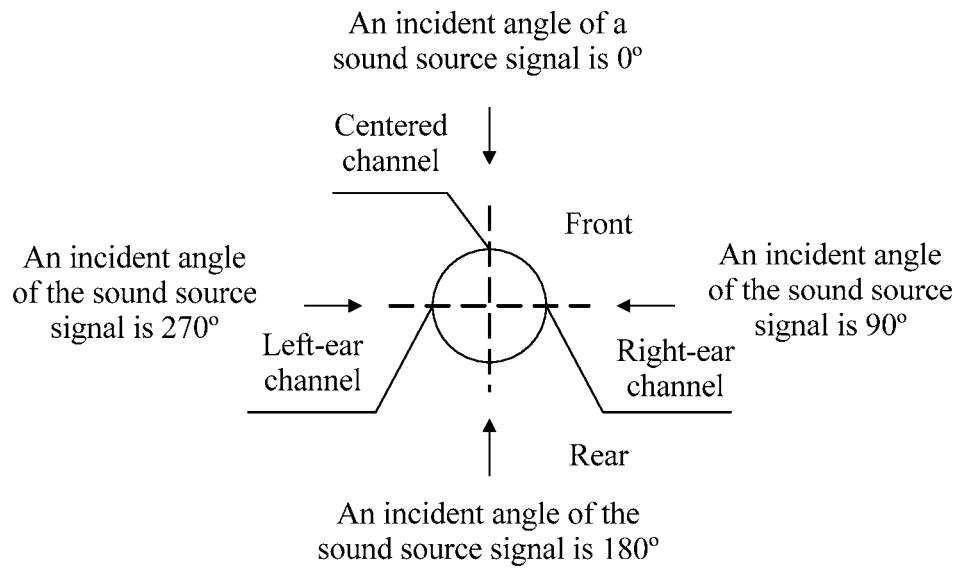
FIG. 3 is a schematic diagram of division of an incident angle of a sound source signal according to an embodiment of the present disclosure.

After the incident angle of the sound source signal is determined, it may be determined according to the result that the incident angle of the sound source signal is greater than or equal to 0°, and is less than or equal to 90°, or the incident angle of the sound source signal is greater than or equal to 270°, and is less than or equal to 360° that the direction of the sound source is the front direction; or it is determined according to the result that the incident angle of the sound source signal is greater than 90°, and is less than 270° that the direction of the sound source is a rear direction, where the rear direction is a direction away from which the centered channel faces. For example, the rear direction is a direction away from which a face of a user who uses the sound image direction sense processing method according to this embodiment of the present disclosure faces. As shown in FIG. 3, in this embodiment, an angle of entrance of the sound source that is parallel to the centered channel is 0°.

S204. When the direction of the sound source is the front direction, perform at least one type of the following processing: front direction enhancing processing or rear direction weakening processing separately on the left-ear channel signal and the right-ear channel signal.

In this embodiment, when it is determined in the foregoing manner that the direction of the sound source is the front direction, the at least one type of the following processing: the front direction enhancing processing or the rear direction weakening processing is performed separately on the left-ear channel signal and the right-ear channel signal. For a specific implementation process, refer to related records in S103 of Embodiment 1 of the method in the present disclosure, and details are not described herein.

Optionally, S204 may be specifically: when the direction of the sound source is the front direction, and it is further determined that the incident angle of the sound source signal is greater than or equal to 0°, and is less than or equal to a first preset angle, or the incident angle of the sound source signal is greater than or equal to a second preset angle, and is less than or equal to 360°, performing the at least one type of the following processing: the front direction enhancing processing or the rear direction weakening processing separately on the left-ear channel signal and the right-ear channel signal, where the first preset angle is less than 90° and the second preset angle is greater than 270°. For example, the first preset angle may be 60° or 45°, and the second preset angle may be 300° or 315°.

Optionally, the performing the front direction enhancing processing on the left-ear channel signal may include: multiplying a signal that is in the left-ear channel signal and whose frequency belongs to a first preset frequency band by a first gain coefficient, so as to obtain a left-ear channel signal that undergoes the front direction enhancing processing, where the first gain coefficient is a value greater than 1, and an amplitude spectrum of a front head related transfer function (HRTF) corresponding to the first preset frequency band is greater than an amplitude spectrum of a rear HRTF corresponding to the first preset frequency band. Optionally, a difference obtained by subtracting the amplitude spectrum of the rear HRTF corresponding to the first preset frequency band from the amplitude spectrum of the front HRTF corresponding to the first preset frequency band is greater than a preset value, where the preset value is a value greater than 0. Correspondingly, the front direction enhancing processing may be performed on the right-ear channel signal in a similar processing manner.

Optionally, the performing the rear direction weakening processing on the left-ear channel signal may include: multiplying a signal that is in the left-ear channel signal and whose frequency belongs to a second preset frequency band by a second gain coefficient, so as to obtain a left-ear channel signal that undergoes the rear direction weakening processing, where the second gain coefficient is a value less than 1, and the second preset frequency band is a frequency band other than the first preset frequency band. Correspondingly, the rear direction weakening processing may be performed on the right-ear channel signal in a similar processing manner.

Optionally, before the at least one type of the following processing: the front direction enhancing processing or the rear direction weakening processing is performed separately on the left-ear channel signal and the right-ear channel signal, the foregoing first preset frequency band needs to be determined, and details are as follows.

An average value of an amplitude spectrum of an HRTF in a front horizontal plane of a head phantom and an average value of an amplitude spectrum of an HRTF in a rear horizontal plane of the head phantom are obtained, where the head phantom is a head phantom to which the sound image direction sense processing method provided in this embodiment of the present disclosure is applied. An HRTF expression is $H(\theta, \varphi, f)$, where $\theta$ is an azimuth, $\varphi$ is an elevation angle, and $f$ is a frequency. Therefore, the average value of the amplitude spectrum of the HRTF in the front horizontal plane may be obtained by means of calculation according to $\int H(\theta, \varphi, f)$, where a value of $\theta$ is [0°, 90°] and [270°, 360°], and a value of $\varphi$ is 0°. The average value of the amplitude spectrum of the HRTF in the front horizontal plane is a $f$ related function. The average value of the amplitude spectrum of the HRTF in the rear horizontal plane of the head phantom may be further obtained by means of calculation according to the $\int H(\theta, \varphi, f)$, where the value of $\theta$ is [90°, 270°], and the value of $\varphi$ is 0°. The average value of the amplitude spectrum of the HRTF in the rear horizontal plane is a $f$ related function.

Then, a subtraction is performed between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane; and then an average value of a difference that is between the average value of the amplitude spectrum of the HRTF in the front horizontal plane and the average value of the amplitude spectrum of the HRTF in the rear horizontal plane and that is within the frequency range is obtained according to the difference between the average value of the amplitude spectrum of the HRTF in the front horizontal plane and the average value of the amplitude spectrum of the HRTF in the rear horizontal plane, that is, an average value of a difference that is between the average value of the amplitude spectrum of the HRTF in the front horizontal plane and the average value of the amplitude spectrum of the HRTF in the rear horizontal plane and that is corresponding to each frequency is obtained, so as to obtain a specific value; and then the difference between the average value of the amplitude spectrum of the HRTF in the front horizontal plane and the average value of the amplitude spectrum of the HRTF in the rear horizontal plane is compared with the average value of the difference that is between the average value of the amplitude spectrum of the HRTF in the front horizontal plane and the average value of the amplitude spectrum of the HRTF in the rear horizontal plane and that is within the frequency range, and a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range is used as the first preset frequency band.

In specific implementation, the first preset frequency band may include at least one of the following frequency bands: [3 kHz,8 kHz], [10 kHz,12 kHz], [17 kHz,20 kHz], and the second preset frequency band may include at least one of the following frequency bands: [0 kHz,3 kHz), (8 kHz,10 kHz), and (12 kHz,17 kHz). Alternatively, the first preset frequency band may include at least one of the following frequency bands: [3 kHz,8.1 kHz], [10 kHz,12.5 kHz], and [17 kHz,20 kHz], and the second preset frequency band may include at least one of the following frequency bands: [0 kHz,3 kHz), (8.1 kHz,10 kHz), and (12.5 kHz,17 kHz). This embodiment of the present disclosure is not limited thereto.

In a first application scenario, if the head phantom to which the sound image direction sense processing method provided in this embodiment of the present disclosure is applied is a head phantom of a Chinese voice, the first preset frequency band may include [3 kHz,8 kHz], [10 kHz,12 kHz] and [17 kHz,20 kHz], and the second preset frequency band may include [0 kHz,3 kHz), (8 kHz,10 kHz), (12 kHz,17 kHz). Specifically, a band-pass filter whose range is the first preset frequency band may be used, where a gain coefficient of the band-pass filter is a value greater than 1. Then, convolution is performed on the band-pass filter and left-ear channel signal or right-ear channel signal, so that a front direction of a signal whose frequency belongs to the first preset frequency band can be enhanced. A band-pass filter whose range is the second preset frequency band may be used, where a gain coefficient of the band-pass filter is a positive value less than or equal to 1. Then, convolution is performed on the band-pass filter and left-ear channel signal or right-ear channel signal, so that a rear direction of a signal whose frequency belongs to the second preset frequency band can be weakened.

For example, sound image direction sense processing may be performed on the left-ear channel signal and the right-ear channel signal by using the following formulas.

Processing described in a formula (4) is performed on the left-ear channel signal, and the formula (4) is, for example:

$$L' = M_1 \times H_{low} \otimes L + \sum_{1}^{K} M_{i+1} \times H_{bandi} \otimes L,$$

where L' is a left-ear channel signal that undergoes the sound image direction sense processing, L is the left-ear channel signal before the sound image direction sense processing, $H_{low}$ represents a low-pass filter whose cut-off frequency is $F_1$, $M_1$ is a gain coefficient of the low-pass filter whose cut-off frequency is $F_1$, $H_{bandi}$ represents a band-pass filter, where the band-pass filter band is $[F_i, F_{i+1}]$, and $M_i$ is a gain coefficient of the band-pass filter.

Processing described in a formula (5) is performed on the right-ear channel signal, and the formula (5) is, for example:

$$R' = M_1 \times H_{low} \otimes R + \sum_{1}^{K} M_{i+1} \times H_{bandi} \otimes R,$$

where R is a right-ear channel signal that undergoes the sound image direction sense processing, and R is the right-ear channel signal before the sound image direction sense processing.

Optionally, for example, one low-pass filter and five band-pass filters may be used, and K is 5. $F_1$=3 kHz, $F_2$=8 kHz, $F_3$=10 kHz, $F_4$=12 kHz, $F_5$=17 kHz, and $F_6$=20 kHz; and correspondingly, $M_1$=1, $M_2$=2, $M_3$=0.5, $M_4$=2, $M_5$=0.5, and $M_6$=2. Therefore, a signal in the first preset frequency band [3 kHz,8 kHz], [10 kHz,12 kHz], and [17 kHz,20 kHz] may be enhanced, that is, an amplitude of the signal in the first preset frequency band may be increased by 6 dB; and a signal in the second preset frequency band (8 kHz,10 kHz) and (12 kHz,17 kHz) may be weakened, that is, an amplitude of the signal in the second preset frequency band may be reduced by 3 dB.

Optionally, for example, one low-pass filter and seven band-pass filters may be used, and K is 7. $F_1$=3 kHz, $F_2$=5 kHz, $F_3$=8 kHz, $F_4$=10 kHz, $F_5$=12 kHz, $F_6$=15 kHz, $F_7$=17 kHz; and $F_8$20 kHz; and correspondingly, $M_1$=1, $M_2$=1.8, $M_3$=2, $M_4$=0.5, $M_5$=2, $M_6$=0.8, $M_7$=0.5, and $M_8$=2. Therefore, a signal in the first preset frequency band [3 kHz,8 kHz], [10 kHz,12 kHz], and [17 kHz,20 kHz] may be enhanced; and a signal in the second preset frequency band (8 kHz, 10 kHz) and (12 kHz,17 kHz) may be weakened.

Optionally, when the incident angle of the sound source signal is greater than or equal to 0°, and is less than or equal to 45°, or when the incident angle of the sound source signal is greater than or equal to 315°, and is less than or equal to 360°, one low-pass filter and five band-pass filters may be used, and K is 5. $F_1$=3 kHz, $F_2$=8 kHz, $F_3$=10 kHz, $F_4$=12 kHz, $F_5$=17 kHz, and $F_6$=20 kHz; and correspondingly, $M_1$=1, $M_2$=2.8, $M_3$=0.5, $M_4$=1.4, $M_5$=0.5, and $M_6$=2. Therefore, a signal in the first preset frequency band [3 kHz,8 kHz], [10 kHz,12 kHz], and [17 kHz,20 kHz] may be enhanced, that is, an amplitude of a signal in the frequency band [3 kHz, 8 kHz] may be increased by 9 dB, an amplitude of a signal in the frequency band [10 kHz,12 kHz] may be increased by 9 dB, and an amplitude of a signal in the frequency band [17 kHz,20 kHz] may be increased by 9 dB; and a signal in the second preset frequency band (8 kHz, 10 kHz) and (12 kHz,17 kHz) may be weakened, that is, an amplitude of the signal in the second preset frequency band may be reduced by 3 dB. When the incident angle of the sound source signal is greater than or equal to 45°, and is less than or equal to 90°, or when the incident angle of the sound source signal is greater than or equal to 270°, and is less than or equal to 315°, one low-pass filter and five band-pass filters may be used, and K is 5. $F_1$=3 kHz, $F_2$=8 kHz, $F_3$=10 kHz, $F_4$=12 kHz, $F_5$=17 kHz, and $F_6$=20 kHz; and correspondingly, $M_1$=1, $M_2$=2.8, $M_3$=0.71, $M_4$=2, $M_5$=0.5, and $M_6$=2.8. Therefore, a signal in the first preset frequency band [3 kHz,8 kHz], [10 kHz,12 kHz], and [17 kHz,20 kHz] may be enhanced, that is, an amplitude of a signal in the frequency band [3 kHz,8 kHz,8 kHz] may be increased by 9 dB, an amplitude of a signal in the frequency band [10 kHz,12 kHz] may be increased by 6 dB, and an amplitude of a signal in the frequency band [17 kHz, 20 kHz] may be increased by 9 dB; and a signal in the second preset frequency band (8 kHz,10 kHz) and (12 kHz,17 kHz) may be weakened, that is, an amplitude of a signal in the frequency band (8 kHz,10 kHz) may be reduced by 3 dB, and an amplitude of a signal in the frequency band (12 kHz,17 kHz) may be reduced by 6 dB.

In a second application scenario, if the head phantom to which the sound image direction sense processing method provided in this embodiment of the present disclosure is applied is a KEMAR artificial head phantom, the first preset frequency band may include [3 kHz,8.1 kHz], [10 kHz,12.5 kHz], and [17 kHz,20 kHz], and the second preset frequency band may include [0 kHz,3 kHz), (8.1 kHz,10 kHz), and (12.5 kHz,17 kHz). Specifically, a band-pass filter whose range is the first preset frequency band may be used, where a gain coefficient of the band-pass filter is a value greater than 1. Then, convolution is performed on the band-pass filter and left-ear channel signal or right-ear channel signal, so that a front direction of a signal whose frequency belongs to the first preset frequency band can be enhanced. A band-pass filter whose range is the second preset frequency band may be used, where a gain coefficient of the band-pass filter is a positive value less than or equal to 1. Then, convolution is performed on the band-pass filter and left-ear channel signal or right-ear channel signal, so that a rear direction of a signal whose frequency belongs to the second preset frequency band can be weakened.

Optionally, for example, one low-pass filter and five band-pass filters may be used, and K is 5. $F_1=3$ kHz, $F_2=8.1$ kHz, $F_3=10$ kHz, $F_4=12.5$ kHz, $F_5=17$ kHz, and $F_6=20$ kHz; and correspondingly, $M_1=1$, $M_2=2$, $M_3=0.5$, $M_4=2$, $M_5=0.5$, and $M_6=2$. Therefore, a signal in the first preset frequency band [3 kHz,8.1 kHz], [10 kHz,12.5 kHz], and [17 kHz,20 kHz] may be enhanced, that is, an amplitude of the signal in the first preset frequency band may be increased by 6 dB; and a signal in the second preset frequency band (8.1 kHz,10 kHz) and (12.5 kHz,17 kHz) may be weakened, that is, an amplitude of the signal in the second preset frequency band may be reduced by 3 dB.

According to the sound image direction sense processing method provided in this embodiment of the present disclosure, a left-ear channel signal, a right-ear channel signal, and a centered channel signal that are of a sound source are obtained; whether a direction of the sound source is a front direction is determined according to a delay difference between the left-ear channel signal and the right-ear channel signal, a delay difference between the left-ear channel signal and the centered channel signal, and a delay difference between the right-ear channel signal and the centered channel signal; and when the direction of the sound source is the front direction, at least one type of the following processing: front direction enhancing processing or rear direction weakening processing is performed separately on the left-ear channel signal and the right-ear channel signal. Therefore, a difference between front direction sense and rear direction sense of a sound image may be enlarged, so that a listener can accurately recognize that the sound source is from the front direction, thereby improving accuracy of determining a direction of a sound source.

Figure 4:
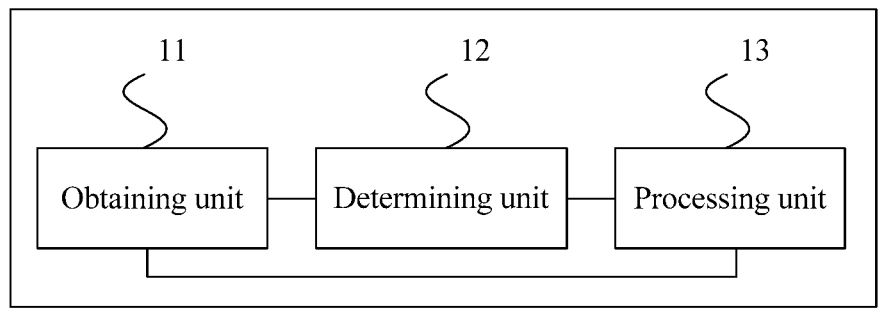
FIG. 4 is a schematic structural diagram of Embodiment 1 of a sound image direction sense processing apparatus according to the present disclosure.

FIG. 4 is a schematic structural diagram of Embodiment 1 of a sound image direction sense processing apparatus according to the present disclosure. As shown in FIG. 4, the apparatus in this embodiment may include: an obtaining unit 11, a determining unit 12, and a processing unit 13. The obtaining unit 11 is configured to obtain a left-ear channel signal, a right-ear channel signal, and a centered channel signal, where the left-ear channel signal is a signal obtained by transmitting a sound source signal to a left-ear channel, the right-ear channel signal is a signal obtained by transmitting the sound source signal to a right-ear channel, and the centered channel signal is a signal obtained by transmitting the sound source signal to a centered channel. The centered channel is located in a mid-vertical plane between the left-ear channel and the right-ear channel. The determining unit 12 is configured to determine, according to the left-ear channel signal, the right-ear channel signal, and the centered channel signal that are obtained by the obtaining unit 11, whether a direction of the sound source is a front direction, where the front direction is a direction that the centered channel faces. The processing unit 13 is configured to: when the determining unit 12 determines that the direction of the sound source is the front direction, perform at least one type of the following processing: front direction enhancing processing or rear direction weakening processing separately on the left-ear channel signal and the right-ear channel signal.

Optionally, the determining unit 12 is configured to: obtain a delay difference between the left-ear channel signal and the right-ear channel signal, a delay difference between the left-ear channel signal and the centered channel signal, and a delay difference between the right-ear channel signal and the centered channel signal according to the left-ear channel signal, the right-ear channel signal, and the centered channel signal; and determine, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction.

Optionally, wherein the determining unit 12 is configured to obtain the delay difference between the left-ear channel signal and the right-ear channel signal, the delay difference between the left-ear channel signal and the centered channel signal, and the delay difference between the right-ear channel signal and the centered channel signal according to the left-ear channel signal, the right-ear channel signal, and the centered channel signal comprises: the determining unit 12 is configured to: obtain a Fourier coefficient $H_L(f)$ of the left-ear channel signal according to the left-ear channel signal; obtain a Fourier coefficient $H_R(f)$ of the right-ear channel signal according to the left-ear channel signal; obtain a Fourier coefficient $H_C(f)$ of the centered channel signal according to the left-ear channel signal;

obtain a maximum value of $\varphi_{LR}(\tau)$ according to $$\phi_{LR}(\tau) = \frac{\int_0^x H_L(f)H_R^*(f)df \times e^{(j2\pi f\tau)}}{\{[\int_0^x |H_L(f)|^2 \, df][\int_0^x |H_R(f)|^2 \, df]\}^{1/2}},$$

and use a value of $\tau$ corresponding to the maximum value of $\varphi_{LR}(\tau)$ as the delay difference between the left-ear channel signal and the right-ear channel signal;

obtain a maximum value of $\varphi_{LC}(\tau)$ according to $$\phi_{LC}(\tau) = \frac{\int_0^x H_L(f)H_C^*(f)df \times e^{(j2\pi f\tau)}}{\{[\int_0^x |H_L(f)|^2 \, df][\int_0^x |H_C(f)|^2 \, df]\}^{1/2}},$$

and use a value of $\tau$ corresponding to the maximum value of $\varphi_{LC}(\tau)$ as the delay difference between the left-ear channel signal and the centered channel signal; and obtain a maximum value of $\varphi_{RC}(\tau)$ according to $$\phi_{RC}(\tau) = \frac{\int_0^x H_R(f)H_C^*(f)df \times e^{(j2\pi f\tau)}}{\{[\int_0^x |H_R(f)|^2 \, df][\int_0^x |H_C(f)|^2 \, df]\}^{1/2}},$$

and use a value of $\tau$ corresponding to the maximum value of $\varphi_{RC}(\tau)$ as the delay difference between the right-ear channel signal and the centered channel signal, where $H_R^*(f)$ and $H_R(f)$ are conjugate, $H_C^*(f)$ and $H_C(f)$ are conjugate, j represents a complex number, [0,x] represents a frequency range, and $-1$ ms$\leq\tau\leq 1$ ms.

Optionally, wherein the determining unit 12 is configured to determine, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction comprises: the determining unit 12 is configured to:

when $$0 \le \frac{c \times ITD_{LR}}{2a} \le \frac{\sqrt{2}}{2},$$

determine that an incident angle of the sound source signal is $$\arcsin\left(\frac{c \times ITD_{LR}}{2a}\right),$$

where if $|ITD_{LC}|>|ITD_{RC}|$, the incident angle of the sound source signal is greater than or equal to 0°, and is less than or equal to 45°; or if $|ITD_{LC}|<|ITD_{RC}|$, the incident angle of the sound source signal is greater than or equal to 135°, and is less than or equal to 180°;

when $$-\frac{\sqrt{2}}{2} \le \frac{c \times ITD_{LR}}{2a} \le 0,$$

determine that an incident angle of the sound source signal is $$\arcsin\left(\frac{c \times ITD_{LR}}{2a}\right),$$

where if $|ITD_{LC}|>|ITD_{RC}|$, the incident angle of the sound source signal is greater than or equal to 315°, and is less than or equal to 360°; or if $|ITD_{LC}|<|ITD_{RC}|$, the incident angle of the sound source signal is greater than or equal to 180°, and is less than or equal to 225°;

when $$\frac{\sqrt{2}}{2} \le \frac{c \times ITD_{LR}}{2a} \le 1,$$

determine that an incident angle of the sound source signal is $$45° - \arcsin\left(\frac{c \times ITD_{RC}}{2a}\right);$$

or when $$-1 \le \frac{c \times ITD_{LR}}{2a} \le -\frac{\sqrt{2}}{2},$$

determine that an incident angle of the sound source signal is $$\arcsin\left(\frac{c \times ITD_{LC}}{2a}\right) \le 45°,$$

where $ITD_{LR}$ is the delay difference between the left-ear channel signal and the right-ear channel signal, $ITD_{RC}$ is the delay difference between the right-ear channel signal and the centered channel signal, and $ITD_{LC}$ is the delay difference between the left-ear channel signal and the centered channel signal, where c represents a sound speed, and a represents a half of a distance between the left-ear channel and the right-ear channel; and determine, according to the result that the incident angle of the sound source signal is greater than or equal to 0°, and is less than or equal to 90°, or the incident angle of the sound source signal is greater than or equal to 270°, and is less than or equal to 360°, that the direction of the sound source is the front direction; or determine, according to the result that the incident angle of the sound source signal is greater than 90°, and is less than 270°, that the direction of the sound source is a rear direction, where the rear direction is a direction away from which the centered channel faces.

Optionally, the processing unit 13 is configured to: when the determining unit 12 determines that the incident angle of the sound source signal is greater than or equal to 0°, and is less than or equal to a first preset angle, or the incident angle of the sound source signal is greater than or equal to a second preset angle, and is less than or equal to 360°, perform the at least one type of the following processing: the front direction enhancing processing or the rear direction weakening processing separately on the left-ear channel signal and the right-ear channel signal, where the first preset angle is less than 90°, and the second preset angle is greater than 270°.

Optionally, wherein the processing unit 13 is configured to perform the front direction enhancing processing separately on the left-ear channel signal and the right-ear channel signal comprises: the processing unit 13 is configured to: separately multiply signals that are in the left-ear channel signal and the right-ear channel signal and whose frequency belongs to a first preset frequency band by a first gain coefficient, so as to obtain a left-ear channel signal and a right-ear channel signal that undergo the front direction enhancing processing, where the first gain coefficient is a value greater than 1, and an amplitude spectrum of a front head related transfer function HRTF corresponding to the first preset frequency band is greater than an amplitude spectrum of a rear HRTF corresponding to the first preset frequency band.

Wherein the processing unit 13 is configured to perform the rear direction weakening processing separately on the left-ear channel signal and the right-ear channel signal comprises: the processing unit 13 is configured to: separately multiply signals that are in the left-ear channel signal and the right-ear channel signal and whose frequency belongs to a second preset frequency band by a second gain coefficient, so as to obtain a left-ear channel signal and a right-ear channel signal that undergo the rear direction weakening processing, where the second gain coefficient is a positive value less than or equal to 1, and the second preset frequency band is a frequency band other than the first preset frequency band.

Optionally, the obtaining unit 11 is further configured to: before the processing unit 13 performs the at least one type of the following processing: the front direction enhancing processing or the rear direction weakening processing separately on the left-ear channel signal and the right-ear channel signal, obtain an average value of an amplitude spectrum of an HRTF in a front horizontal plane of a head phantom, and an average value of an amplitude spectrum of an HRTF in a rear horizontal plane of the head phantom, where the head phantom is a head phantom to which the apparatus is applied; perform a subtraction between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane; obtain, according to the difference between the average value of the amplitude spectrum of the HRTF in the front horizontal plane and the average value of the amplitude spectrum of the HRTF in the rear horizontal plane, an average value of a difference that is between the average value of the amplitude spectrum of the HRTF in the front horizontal plane and the average value of the amplitude spectrum of the HRTF in the rear horizontal plane and that is within the frequency range; and use a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range as the first preset frequency band.

The apparatus in this embodiment may be configured to execute the technical solutions in the foregoing method embodiments of the present disclosure, and implementation principles and technical effects thereof are similar and are not described herein.

Figure 5:
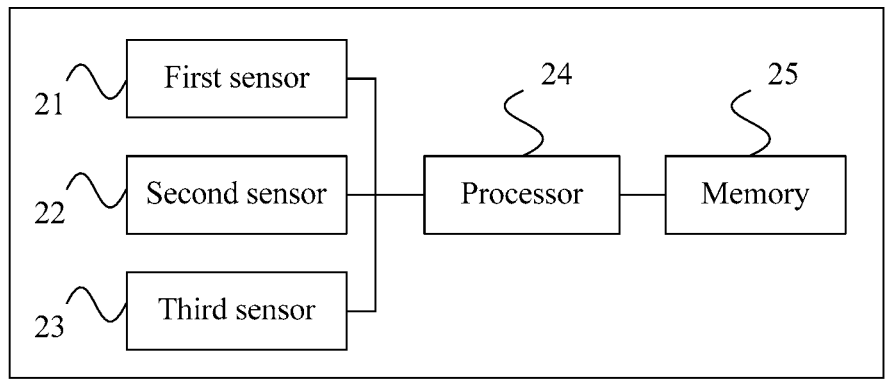
FIG. 5 is a schematic structural diagram of Embodiment 2 of a sound image direction sense processing apparatus according to the present disclosure.

FIG. 5 is a schematic structural diagram of Embodiment 2 of a sound image direction sense processing apparatus according to the present disclosure. As shown in FIG. 5, the apparatus in this embodiment may include: a first sensor 21, a second sensor 22, a third sensor 23, a processor 24, and a memory 25. The memory 25 is configured to store code of executing a sound image direction sense processing method, and the memory 25 may include a non-volatile memory. The processor 24 may be a central processing unit (CPU), or an application-specific integrated circuit (ASIC), or one or more integrated circuits configured to implement this embodiment of the present disclosure. The first sensor 21, the second sensor 22, and the third sensor 23 are sensors configured to collect sound, for example, microphones. The first sensor 21 may be disposed, for example, in a left ear of a user; the second sensor 22 may be disposed, for example, in a right ear of the user; and the third sensor 23 may be disposed on a nose bridge of the user. The processor 24 is configured to invoke the code to execute the following operations.

The first sensor 21 is configured to obtain a left-ear channel signal, where the left-ear channel signal is a signal obtained by transmitting a sound source signal to a left-ear channel.

The second sensor 22 is configured to obtain a right-ear channel signal, where the right-ear channel signal is a signal obtained by transmitting the sound source signal to a right-ear channel.

The third sensor 23 is configured to obtain a centered channel signal, where the centered channel signal is a signal obtained by transmitting the sound source signal to a centered channel, and the centered channel is located in a mid-vertical plane between the left-ear channel and the right-ear channel.

The processor 24 is configured to: determine, according to the left-ear channel signal obtained by the first sensor 21, the right-ear channel signal obtained by the second sensor 22, and the centered channel signal obtained by the third sensor 23, whether a direction of the sound source is a front direction, where the front direction is a direction that the centered channel faces; and when the direction of the sound source is the front direction, perform at least one type of the following processing: front direction enhancing processing or rear direction weakening processing separately on the left-ear channel signal and the right-ear channel signal.

Optionally, wherein the processor 24 is configured to determine, according to the left-ear channel signal obtained by the first sensor 21, the right-ear channel signal obtained by the second sensor 22, and the centered channel signal obtained by the third sensor 23, whether the direction of the sound source is the front direction comprises: the processor 24 is configured to obtain a delay difference between the left-ear channel signal and the right-ear channel signal, a delay difference between the left-ear channel signal and the centered channel signal, and a delay difference between the right-ear channel signal and the centered channel signal according to the left-ear channel signal, the right-ear channel signal, and the centered channel signal; and determine, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction.

Optionally, wherein the processor 24 is configured to obtain the delay difference between the left-ear channel signal and the right-ear channel signal, the delay difference between the left-ear channel signal and the centered channel signal, and the delay difference between the right-ear channel signal and the centered channel signal according to the left-ear channel signal, the right-ear channel signal, and the centered channel signal comprises: the processor 24 is configured to: obtain a Fourier coefficient $H_L(f)$ of the left-ear channel signal according to the left-ear channel signal; obtain a Fourier coefficient $H_R(f)$ of the right-ear channel signal according to the left-ear channel signal; obtain a Fourier coefficient $H_C(f)$ of the centered channel signal according to the left-ear channel signal;

obtain a maximum value of $\varphi_{LR}(\tau)$ according to $$\phi_{LR}(\tau) = \frac{\int_0^x H_L(f) H_R^*(f) df \times e^{(j2\pi f \tau)}}{\{[\int_0^x |H_L(f)|^2 df][\int_0^x |H_R(f)|^2 df]\}^{1/2}},$$

and use a value of $\tau$ corresponding to the maximum value of $\varphi_{LR}(\tau)$ as the delay difference between the left-ear channel signal and the right-ear channel signal;

obtain a maximum value of $\varphi_{LC}(\tau)$ according to $$\phi_{LC}(\tau) = \frac{\int_0^x H_L(f) H_C^*(f) df \times e^{(j2\pi f\tau)}}{\{[\int_0^x |H_L(f)|^2 df][\int_0^x |H_C(f)|^2 df]\}^{1/2}},$$

and use a value of $\tau$ corresponding to the maximum value of $\varphi_{LC}(\tau)$ as the delay difference between the left-ear channel signal and the centered channel signal; and obtain a maximum value of $\varphi_{LC}(\tau)$ according to $$\phi_{RC}(\tau) = \frac{\int_0^x H_R(f) H_C^*(f) df \times e^{(j2\pi f\tau)}}{\{[\int_0^x |H_R(f)|^2 df][\int_0^x |H_C(f)|^2 df]\}^{1/2}},$$

and use a value of $\tau$ corresponding to the maximum value of $\varphi_{LC}(\tau)$ as the delay difference between the right-ear channel signal and the centered channel signal, where $H^*_R(f)$ and $H_R(f)$ are conjugate, $H^*_C(f)$ and $H_C(f)$ are conjugate, j represents a complex number, [0,x] represents a frequency range, and $-1\ \text{ms} \leq \tau \leq 1\ \text{ms}$.

Optionally, wherein the processor 24 is configured to determine, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction comprises: the processor 24 is configured to:

when $$0 \leq \frac{c \times ITD_{LR}}{2a} \leq \frac{\sqrt{2}}{2},$$

determine that an incident angle of the sound source signal is $$\arcsin\left(\frac{c \times ITD_{LR}}{2a}\right),$$

where if $|ITD_{LC}| > |ITD_{RC}|$, the incident angle of the sound source signal is greater than or equal to 0°, and is less than or equal to 45°; or if $|ITD_{LC}| < |ITD_{RC}|$, the incident angle of the sound source signal is greater than or equal to 135, and is less than or equal to 180°;

when $$-\frac{\sqrt{2}}{2} \leq \frac{c \times ITD_{LR}}{2a} \leq 0,$$

determine that an incident angle of the sound source signal is $$\arcsin\left(\frac{c \times ITD_{LR}}{2a}\right),$$

where if $|ITD_{LC}| > |ITD_{RC}|$, the incident angle of the sound source signal is greater than or equal to 315°, and is less than or equal to 360°; or if $|ITD_{LC}| < |ITD_{RC}|$, the incident angle of the sound source signal is greater than or equal to 180°; and is less than or equal to 225°;

when $$\frac{\sqrt{2}}{2} \leq \frac{c \times ITD_{LR}}{2a} \leq 1,$$

determine that an incident angle of the sound source signal is $$45° - \arcsin\left(\frac{c \times ITD_{RC}}{2a}\right);$$

or when $$-1 \leq \frac{c \times ITD_{LR}}{2a} \leq -\frac{\sqrt{2}}{2},$$

determine that an incident angle of the sound source signal is $$\arcsin\left(\frac{c \times ITD_{LC}}{2a}\right) - 45°,$$

where $ITD_{LR}$ is the delay difference between the left-ear channel signal and the right-ear channel signal, $ITD_{RC}$ is the delay difference between the right-ear channel signal and the centered channel signal, and $ITD_{LC}$ is the delay difference between the left-ear channel signal and the centered channel signal, where c represents a sound speed, and a represents a half of a distance between the left-ear channel and the right-ear channel; and determine, according to the result that the incident angle of the sound source signal is greater than or equal to 0°, and is less than or equal to 90°, or the incident angle of the sound source signal is greater than or equal to 270°, and is less than or equal to 360°, that the direction of the sound source is the front direction; or determine, according to the result that the incident angle of the sound source signal is greater than 90°, and is less than 270°, that the direction of the sound source is a rear direction, where the rear direction is a direction away from which the centered channel faces.

Optionally, wherein the processor 24 is configured to perform the at least one type of the following processing: the front direction enhancing processing or the rear direction weakening processing separately on the left-ear channel signal and the right-ear channel signal comprises: the processor 24 is configured to: when the incident angle of the sound source signal is greater than or equal to 0°, and is less than or equal to a first preset angle, or the incident angle of the sound source signal is greater than or equal to a second preset angle, and is less than or equal to 360°, perform the at least one type of the following processing: the front direction enhancing processing or the rear direction weakening processing separately on the left-ear channel signal and the right-ear channel signal, where the first preset angle is less than 90°, and the second preset angle is greater than 270°.

Optionally, wherein the processor 24 is configured to perform the front direction enhancing processing separately on the left-ear channel signal and the right-ear channel signal comprises: the processor 24 is configured to: separately multiply signals that are in the left-ear channel signal and the right-ear channel signal and whose frequency belongs to a first preset frequency band by a first gain coefficient, so as to obtain a left-ear channel signal and a right-ear channel signal that undergo the front direction enhancing processing, where the first gain coefficient is a value greater than 1, and an amplitude spectrum of a front HRTF corresponding to the first preset frequency band is greater than an amplitude spectrum of a rear HRTF corresponding to the first preset frequency band.

Wherein the processor 24 is configured to perform the rear direction weakening processing separately on the left-ear channel signal and the right-ear channel signal comprises: the processor 24 is configured to: separately multiply signals that are in the left-ear channel signal and the right-ear channel signal and whose frequency belongs to a second preset frequency band by a second gain coefficient, so as to obtain a left-ear channel signal and a right-ear channel signal that undergo the rear direction weakening processing, where the second gain coefficient is a positive value less than or equal to 1, and the second preset frequency band is a frequency band other than the first preset frequency band.

Optionally, the processor 24 is further configured to: before the at least one type of the following processing: the front direction enhancing processing or the rear direction weakening processing is performed separately on the left-ear channel signal and the right-ear channel signal, obtain an average value of an amplitude spectrum of an HRTF in a front horizontal plane of a head phantom, and an average value of an amplitude spectrum of an HRTF in a rear horizontal plane of the head phantom, where the head phantom is a head phantom to which the apparatus is applied; perform a subtraction between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane; obtain, according to the difference between the average value of the amplitude spectrum of the HRTF in the front horizontal plane and the average value of the amplitude spectrum of the HRTF in the rear horizontal plane, an average value of a difference that is between the average value of the amplitude spectrum of the HRTF in the front horizontal plane and the average value of the amplitude spectrum of the HRTF in the rear horizontal plane and that is within the frequency range; and use a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range as the first preset frequency band.

The apparatus in this embodiment may be configured to execute the technical solutions in the foregoing method embodiments of the present disclosure, and implementation principles and technical effects thereof are similar and are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure. Additionally, statements made herein characterizing the invention refer to an embodiment of the invention and not necessarily all embodiments.

What is claimed is:

1. A sound image direction sense processing method, comprising: obtaining, by a sound image direction sense processing apparatus, a left-ear channel signal, a right-ear channel signal, and a centered channel signal, wherein the left-ear channel signal is obtained by transmitting a sound source signal to a left-ear channel, the right-ear channel signal is obtained by transmitting the sound source signal to a right-ear channel, and the centered channel signal is obtained by transmitting the sound source signal to a centered channel, wherein the centered channel is located in a mid-vertical plane between the left-ear channel and the right-ear channel; determining, by the sound image direction sense processing apparatus, according to the left-ear channel signal, the right-ear channel signal, and the centered channel signal, whether a direction of a sound source is a front direction, wherein the front direction is a direction that the centered channel faces; and when the direction of the sound source is the front direction, performing, by the sound image direction sense processing apparatus, front direction enhancing processing and/or rear direction weakening processing separately on the left-ear channel signal and the right-ear channel signal; wherein performing front direction enhancing processing separately on the left-ear channel signal and the right-ear channel signal comprises: separately multiplying signals that are in the left-ear channel signal and the right-ear channel signal and whose frequency belongs to a first preset frequency band by a first gain coefficient, so as to obtain a left-ear channel signal and a right-ear channel signal that have undergone front direction enhancing processing, wherein the first gain coefficient is a value greater than 1, and an amplitude spectrum of a front head related transfer function (HRTF) corresponding to the first preset frequency band is greater than an amplitude spectrum of a rear HRTF corresponding to the first preset frequency band; and wherein performing rear direction weakening processing separately on the left-ear channel signal and the right-ear channel signal comprises: separately multiplying signals that are in the left-ear channel signal and the right-ear channel signal and whose frequency belongs to a second preset frequency band by a second gain coefficient, so as to obtain a left-ear channel signal and a right-ear channel signal that have undergone rear direction weakening processing, wherein the second gain coefficient is a positive value less than or equal to 1, and the second preset frequency band is a frequency band other than the first preset frequency band.

2. The method according to claim 1, wherein determining whether the direction of the sound source is the front direction comprises:
- obtaining a delay difference between the left-ear channel signal and the right-ear channel signal, a delay difference between the left-ear channel signal and the centered channel signal, and a delay difference between the right-ear channel signal and the centered channel signal; and
- determining, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction.

3. The method according to claim 2, wherein obtaining the delay difference between the left-ear channel signal and the right-ear channel signal, the delay difference between the left-ear channel signal and the centered channel signal, and the delay difference between the right-ear channel signal and the centered channel signal comprises:
- obtaining a Fourier coefficient $H_L(f)$ of the left-ear channel signal according to the left-ear channel signal;
- obtaining a Fourier coefficient $H_R(f)$ of the right-ear channel signal according to the left-ear channel signal;
- obtaining a Fourier coefficient $H_C(f)$ of the centered channel signal according to the left-ear channel signal;
- obtaining a maximum value of $\varphi_{LR}(\tau)$ according to $$\phi_{LR}(\tau) = \frac{\int_0^x H_L(f) H_R^*(f) df \times e^{(j2\pi f\tau)}}{\{[\int_0^x |H_L(f)|^2 df][\int_0^x |H_R(f)|^2 df]\}^{1/2}},$$

and using a value of $\tau$ corresponding to the maximum value of $\varphi_{LR}(\tau)$ as the delay difference between the left-ear channel signal and the right-ear channel signal;
- obtaining a maximum value of $\varphi_{LC}(\tau)$ according to $$\phi_{LC}(\tau) = \frac{\int_0^x H_L(f) H_C^*(f) df \times e^{(j2\pi f\tau)}}{\{[\int_0^x |H_L(f)|^2 df][\int_0^x |H_C(f)|^2 df]\}^{1/2}},$$

and using a value of $\tau$ corresponding to the maximum value of $\varphi_{LC}(\tau)$ as the delay difference between the left-ear channel signal and the centered channel signal; and
- obtaining a maximum value of $\varphi_{RC}(\tau)$ according to $$\phi_{RC}(\tau) = \frac{\int_0^x H_R(f) H_C^*(f) df \times e^{(j2\pi f\tau)}}{\{[\int_0^x |H_R(f)|^2 df][\int_0^x |H_C(f)|^2 df]\}^{1/2}},$$

and using a value of $\tau$ corresponding to the maximum value of $\varphi_{RC}(\tau)$ as the delay difference between the right-ear channel signal and the centered channel signal;
wherein $H^*_R(f)$ and $H_R(f)$ are conjugates, $H^*_C(f)$ and $H_C(f)$ are conjugates, j represents a complex number, [0,x] represents a frequency range, and $-1$ ms$\leq\tau\leq 1$ ms.

4. The method according to claim 2, wherein determining whether the direction of the sound source is the front direction comprises:

when $$0 \leq \frac{c \times ITD_{LR}}{2a} \leq \frac{\sqrt{2}}{2},$$

determining that an incident angle of the sound source signal is $$\arcsin\left(\frac{c \times ITD_{LR}}{2a}\right),$$

wherein: if $|ITD_{LC}|>|ITD_{RC}|$, the incident angle of the sound source signal is greater than or equal to 0°, and is less than or equal to 45°; or if $|ITD_{LC}|<|ITD_{RC}|$, the incident angle of the sound source signal is greater than or equal to 135°, and is less than or equal to 180°; when $$-\frac{\sqrt{2}}{2} \leq \frac{c \times ITD_{LR}}{2a} \leq 0,$$

determining that an incident angle of the sound source signal is $$\arcsin\left(\frac{c \times ITD_{LR}}{2a}\right),$$

wherein: if $|ITD_{LC}|>|ITD_{RC}|$, the incident angle of the sound source signal is greater than or equal to 315°, and is less than or equal to 360°; or if $|ITD_{LC}|<|ITD_{RC}|$, the incident angle of the sound source signal is greater than or equal to 180°, and is less than or equal to 225°; when $$\frac{\sqrt{2}}{2} \leq \frac{c \times ITD_{LR}}{2a} \leq 1,$$

determining that an incident angle of the sound source signal is $$45° - \arcsin\left(\frac{c \times ITD_{RC}}{2a}\right);$$

or when $$-1 \leq \frac{c \times ITD_{LR}}{2a} \leq -\frac{\sqrt{2}}{2},$$

determining that an incident angle of the sound source signal is $$\arcsin\left(\frac{c \times ITD_{LC}}{2a}\right) - 45°;$$

wherein $ITD_{LR}$ is the delay difference between the left-ear channel signal and the right-ear channel signal, $ITD_{RC}$ is the delay difference between the right-ear channel signal and the centered channel signal, and $\text{ITD}_{LC}$ is the delay difference between the left-ear channel signal and the centered channel signal, where c represents a sound speed, and a represents a half of a distance between the left-ear channel and the right-ear channel; and determining, according to the result that the incident angle of the sound source signal is greater than or equal to 0°, and is less than or equal to 90°, or the incident angle of the sound source signal is greater than or equal to 270°, and is less than or equal to 360°, that the direction of the sound source is the front direction; or determining, according to the result that the incident angle of the sound source signal is greater than 90°, and is less than 270°, that the direction of the sound source is a rear direction, wherein the rear direction is a direction away from which the centered channel faces.

5. The method according to claim 4, wherein before performing front direction enhancing processing and/or rear direction weakening processing separately on the left-ear channel signal and the right-ear channel signal, the method further comprises:

determining that the incident angle of the sound source signal is greater than or equal to 0°, and is less than or equal to a first preset angle, or that the incident angle of the sound source signal is greater than or equal to a second preset angle, and is less than or equal to 360°, wherein the first preset angle is less than 90°, and the second preset angle is greater than 270°.

6. The method according to claim 1, wherein before performing front direction enhancing processing and/or rear direction weakening processing separately on the left-ear channel signal and the right-ear channel signal, the method further comprises:

obtaining an average value of an amplitude spectrum of an HRTF in a front horizontal plane of a head phantom, and an average value of an amplitude spectrum of an HRTF in a rear horizontal plane of the head phantom;

performing a subtraction between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane;

obtaining, according to the difference between the average value of the amplitude spectrum of the HRTF in the front horizontal plane and the average value of the amplitude spectrum of the HRTF in the rear horizontal plane, an average value of a difference that is between the average value of the amplitude spectrum of the HRTF in the front horizontal plane and the average value of the amplitude spectrum of the HRTF in the rear horizontal plane and that is within the frequency range; and using a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range as the first preset frequency band.

7. A sound image direction sense processing apparatus, comprising a processor and a non-transitory computer-readable medium having processor-executable instructions stored thereon, wherein the processor-executable instructions, when executed by the processor, facilitate performance of the following: obtaining a left-ear channel signal, a right-ear channel signal, and a centered channel signal, wherein the left-ear channel signal is obtained by transmitting a sound source signal to a left-ear channel, the right-ear channel signal is obtained by transmitting the sound source signal to a right-ear channel, and the centered channel signal is obtained by transmitting the sound source signal to a centered channel, wherein the centered channel is located in a mid-vertical plane between the left-ear channel and the right-ear channel; determining, according to the left-ear channel signal, the right-ear channel signal, and the centered channel signal, whether a direction of a sound source is a front direction, wherein the front direction is a direction that the centered channel faces; and when the direction of the sound source is the front direction, performing front direction enhancing processing and/or rear direction weakening processing separately on the left-ear channel signal and the right-ear channel signal; wherein performing front direction enhancing processing separately on the left-ear channel signal and the right-ear channel signal comprises: separately multiplying signals that are in the left-ear channel signal and the right-ear channel signal and whose frequency belongs to a first preset frequency band by a first gain coefficient, so as to obtain a left-ear channel signal and a right-ear channel signal that have undergone front direction enhancing processing, wherein the first gain coefficient is a value greater than 1, and an amplitude spectrum of a front head related transfer function (HRTF) corresponding to the first preset frequency band is greater than an amplitude spectrum of a rear HRTF corresponding to the first preset frequency band; and wherein performing rear direction weakening processing separately on the left-ear channel signal and the right-ear channel signal comprises: separately multiplying signals that are in the left-ear channel signal and the right-ear channel signal and whose frequency belongs to a second preset frequency band by a second gain coefficient, so as to obtain a left-ear channel signal and a right-ear channel signal that have undergone rear direction weakening processing, wherein the second gain coefficient is a positive value less than or equal to 1, and the second preset frequency band is a frequency band other than the first preset frequency band.

8. The apparatus according to claim 7, wherein determining whether the direction of the sound source is the front direction comprises:

obtaining a delay difference between the left-ear channel signal and the right-ear channel signal, a delay difference between the left-car channel signal and the centered channel signal, and a delay difference between the right-ear channel signal and the centered channel signal; and determining, according to the delay difference between the left-ear channel signal and the right-ear channel signal, the delay difference between the left-ear channel signal and the centered channel signal, and the delay difference between the right-ear channel signal and the centered channel signal, whether the direction of the sound source is the front direction.

9. The apparatus according to claim 8, wherein obtaining the delay difference between the left-ear channel signal and the right-ear channel signal, the delay difference between the left-ear channel signal and the centered channel signal, and the delay difference between the right-ear channel signal and the centered channel signal comprises:
obtaining a Fourier coefficient $H_L(f)$ of the left-ear channel signal according to the left-ear channel signal;
obtaining a Fourier coefficient $H_R(f)$ of the right-ear channel signal according to the left-ear channel signal;
obtaining a Fourier coefficient $H_C(f)$ of the centered channel signal according to the left-ear channel signal;
obtaining a maximum value of $\varphi_{LR}(\tau)$ according to $$\phi_{LR}(\tau) = \frac{\int_0^x H_L(f)H_R^*(f)df \times e^{(j2\pi f\tau)}}{\{[\int_0^x |H_L(f)|^2 df][\int_0^x |H_R(f)|^2 df]\}^{1/2}},$$

and using a value of $\tau$ corresponding to the maximum value of $\varphi_{LR}(\tau)$ as the delay difference between the left-ear channel signal and the right-ear channel signal;
obtaining a maximum value of $\varphi_{LC}(\tau)$ according to $$\phi_{LC}(\tau) = \frac{\int_0^x H_L(f)H_C^*(f)df \times e^{(j2\pi f\tau)}}{\{[\int_0^x |H_L(f)|^2 df][\int_0^x |H_C(f)|^2 df]\}^{1/2}},$$

and using a value of $\tau$ corresponding to the maximum value of $\varphi_{LC}(\tau)$ as the delay difference between the left-ear channel signal and the centered channel signal; and
obtaining a maximum value of $\varphi_{RC}(\tau)$ according to $$\phi_{RC}(\tau) = \frac{\int_0^x H_R(f)H_C^*(f)df \times e^{(j2\pi f\tau)}}{\{[\int_0^x |H_R(f)|^2 df][\int_0^x |H_C(f)|^2 df]\}^{1/2}},$$

and using a value of $\tau$ corresponding to the maximum value of $\varphi_{RC}(\tau)$ as the delay difference between the right-ear channel signal and the centered channel signal;
wherein $H^*_R(f)$ and $H_R(f)$ are conjugates, $H^*_C(f)$ and $H_C(f)$ are conjugates, j represents a complex number, [0,x] represents a frequency range, and $-1\text{ ms}\leq\tau\leq 1\text{ ms}$.

10. The apparatus according to claim 8, wherein determining whether the direction of the sound source is the front direction comprises:
when $$0 \leq \frac{c \times ITD_{LR}}{2a} \leq \frac{\sqrt{2}}{2},$$

determining that an incident angle of the sound source signal is $$\arcsin\left(\frac{c \times ITD_{LR}}{2a}\right),$$

wherein: if $|ITD_{LC}|>|ITD_{RC}|$, the incident angle of the sound source signal is greater than or equal to 0°, and is less than or equal to 45°; or if $|ITD_{LC}|<|ITD_{RC}|$, the incident angle of the sound source signal is greater than or equal to 135°, and is less than or equal to 180°; when $$-\frac{\sqrt{2}}{2} \leq \frac{c \times ITD_{LR}}{2a} \leq 0,$$

determining that an incident angle of the sound source signal is $$\arcsin\left(\frac{c \times ITD_{LR}}{2a}\right),$$

wherein: if $|ITD_{LC}|>|ITD_{RC}|$, the incident angle of the sound source signal is greater than or equal to 315°, and is less than or equal to 360°; or if $|ITD_{LC}|<|ITD_{RC}|$, the incident angle of the sound source signal is greater than or equal to 180°, and is less than or equal to 225°; when $$\frac{\sqrt{2}}{2} \leq \frac{c \times ITD_{LR}}{2a} \leq 1,$$

determining that an incident angle of the sound source signal is $$45° - \arcsin\left(\frac{c \times ITD_{RC}}{2a}\right);$$

or when $$-1 \leq \frac{c \times ITD_{LR}}{2a} \leq -\frac{\sqrt{2}}{2},$$

determining that an incident angle of the sound source signal is $$\arcsin\left(\frac{c \times ITD_{LC}}{2a}\right) - 45°;$$

wherein $ITD_{LR}$ is the delay difference between the left-ear channel signal and the right-ear channel signal, $ITD_{RC}$ is the delay difference between the right-ear channel signal and the centered channel signal, and $ITD_{LC}$ is the delay difference between the left-ear channel signal and the centered channel signal, where c represents a sound speed, and a represents a half of a distance between the left-ear channel and the right-ear channel; and
determining, according to the result that the incident angle of the sound source signal is greater than or equal to 0°, and is less than or equal to 90°, or the incident angle of the sound source signal is greater than or equal to 270°, and is less than or equal to 360°, that the direction of the sound source is the front direction; or determining, according to the result that the incident angle of the sound source signal is greater than 90°, and is less than 270°, that the direction of the sound source is a rear direction, wherein the rear direction is a direction away from which the centered channel faces.

11. The apparatus according to claim 10, wherein the processor-executable instructions, when executed, are further configured to facilitate:

before performing front direction enhancing processing and/or rear direction weakening processing separately on the left-ear channel signal and the right-ear channel signal, determining that the incident angle of the sound source signal is greater than or equal to 0°, and is less than or equal to a first preset angle, or the incident angle of the sound source signal is greater than or equal to a second preset angle, and is less than or equal to 360°, wherein the first preset angle is less than 90°, and the second preset angle is greater than 270°.

12. The apparatus according to claim 7, wherein the processor-executable instructions, when executed, are further configured to facilitate:

before performing front direction enhancing processing and/or rear direction weakening processing separately on the left-ear channel signal and the right-ear channel signal, obtaining an average value of an amplitude spectrum of an HRTF in a front horizontal plane of a head phantom, and an average value of an amplitude spectrum of an HRTF in a rear horizontal plane of the head phantom;

performing a subtraction between the average value of the amplitude spectrum of the HRTF in the front horizontal plane and the average value of the amplitude spectrum of the HRTF in the rear horizontal plane, so as to obtain a difference between the average value of the amplitude spectrum of the HRTF in the front horizontal plane and the average value of the amplitude spectrum of the HRTF in the rear horizontal plane;

obtaining, according to the difference between the average value of the amplitude spectrum of the HRTF in the front horizontal plane and the average value of the amplitude spectrum of the HRTF in the rear horizontal plane, an average value of a difference that is between the average value of the amplitude spectrum of the HRTF in the front horizontal plane and the average value of the amplitude spectrum of the HRTF in the rear horizontal plane and that is within the frequency range; and using a frequency band corresponding to a difference between the average value of the amplitude spectrum of the HRTF in the front horizontal plane and the average value of the amplitude spectrum of the HRTF in the rear horizontal plane that is greater than the average value of the difference that is between the average value of the amplitude spectrum of the HRTF in the front horizontal plane and the average value of the amplitude spectrum of the HRTF in the rear horizontal plane and that is within the frequency range as the first preset frequency band.

* * * * *

UNITED STATES PATENT AND TRADEMARK OFFICE
CERTIFICATE OF CORRECTION

PATENT NO. : 9,866,983 B2  
APPLICATION NO. : 15/487914  
DATED : January 9, 2018  
INVENTOR(S) : Qi et al.

Page 1 of 1

It is certified that error appears in the above-identified patent and that said Letters Patent is hereby corrected as shown below:

In the Claims

Column 29, Line 4, "left-car" should read -- left-ear --.

Column 32, Line 53, "left-car" should read -- left-ear --.

Signed and Sealed this
Fifteenth Day of May, 2018

Andrei Iancu
*Director of the United States Patent and Trademark Office*